(12) United States Patent
Chowdhury et al.

(10) Patent No.: US 8,861,379 B2
(45) Date of Patent: Oct. 14, 2014

(54) TEST AUTOMATION FOR AN INTEGRATED TELEPHONY CALL MANAGEMENT SERVICE

(75) Inventors: Shafqat A. Chowdhury, Gaithersburg, MD (US); Henry L. Tam, Brooklyn, NY (US); Benyam S. Chekol, Herndon, VA (US); Krishna P. Kodakkattil, Flower Mound, TX (US); Adam I. Barrow, Roanoke, TX (US); Jennifer B. Babu, Purcellville, VA (US); Susan M. Middlesworth, Silver Spring, MD (US); Francis W. Peer, Aldie, VA (US); Nashwa F. Sidhom, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1648 days.

(21) Appl. No.: 11/828,661

(22) Filed: Jul. 26, 2007

(65) Prior Publication Data

US 2009/0028131 A1  Jan. 29, 2009

(51) Int. Cl.
*H04J 1/16* (2006.01)
*H04L 12/26* (2006.01)
*H04Q 3/00* (2006.01)
*H04L 12/24* (2006.01)
*H04L 12/28* (2006.01)

(52) U.S. Cl.
CPC ............ *H04L 12/2697* (2013.01); *H04L 43/50* (2013.01); *H04Q 2213/13076* (2013.01); *H04Q 2213/1316* (2013.01); *H04Q 3/0087* (2013.01); *H04L 41/0806* (2013.01)
USPC ............................ 370/250; 370/252; 370/360

(58) Field of Classification Search
USPC .......................................... 370/250, 252, 360
See application file for complete search history.

(56) References Cited

U.S. PATENT DOCUMENTS

| 4,887,289 | A | * | 12/1989 | Montegari et al. | ............... 379/22 |
|---|---|---|---|---|---|
| 5,365,518 | A | * | 11/1994 | Noser | ............... 370/535 |
| 5,995,504 | A | * | 11/1999 | Swerdlow | ............... 370/360 |
| 6,404,861 | B1 | * | 6/2002 | Cohen et al. | ............... 379/93.01 |
| 6,674,840 | B1 | * | 1/2004 | Contractor | ............... 379/15.03 |
| 6,826,146 | B1 | * | 11/2004 | Blenis et al. | ............... 370/227 |
| 6,885,973 | B1 | * | 4/2005 | Mayhan | ............... 702/182 |
| 6,996,067 | B1 | * | 2/2006 | Burke et al. | ............... 370/248 |
| 7,646,720 | B1 | * | 1/2010 | Bugenhagen | ............... 370/241 |
| 2002/0107979 | A1 | * | 8/2002 | Sarnikowski et al. | ........ 709/238 |
| 2004/0030859 | A1 | * | 2/2004 | Doerr et al. | ............... 712/15 |
| 2004/0105456 | A1 | * | 6/2004 | Lanzone et al. | ............... 370/429 |
| 2004/0117475 | A1 | * | 6/2004 | Taylor et al. | ............... 709/224 |
| 2009/0028139 | A1 | * | 1/2009 | Peer et al. | ............... 370/386 |

* cited by examiner

*Primary Examiner* — John Pezzlo

(57) ABSTRACT

A test application includes instructions for configuring a digital cross connect. A first modem and a second modem are each connected to at least one telecommunications network and a digital cross connect. An integrated telephony call management service (ITCMS) client includes computer-executable instructions stored on a computer-readable medium included in the test computer.

25 Claims, 3 Drawing Sheets

TEST AUTOMATION FOR AN INTEGRATED TELEPHONY CALL MANAGEMENT SERVICE

BACKGROUND

An Integrated Telephony Call Management Service (ITCMS) may offer a variety of features accessible from a variety of devices. For example, an ITCMS may be accessible from any of a telephone connected to the public switched telephone network (PSTN), a desktop computer, a laptop computer, a handheld computer, or a cellular telephone. Further, an ITCMS may offer users features and functions such as accessing caller ID, accessing voicemail, routing incoming calls to voice mail or to a specified telephone number in real or near real time, scheduling and/or establishing forwarding of incoming calls, sending e-mails and text messages, viewing and placing calls through an address book, viewing a calendar, etc. An ITCMS offers the further benefit of being accessible from anywhere on a network such as the Internet.

Testing the functionality of an ITCMS is at present generally complicated. Such tests generally take place across two or more different telecommunications networks, such as a traditional circuit switched network, and a packet switched network, e.g., an Internet Protocol (IP) network. Telephone line configurations, i.e., "talk paths," used in testing laboratories are generally fixed or "hard-wired," and are generally not dynamically configurable. Further, to the extent that configuration of talk paths may be said to be dynamic at all, such configuration generally must be performed by manually typing one or more command lines into a console.

Challenges and inefficiencies in configuring a test environment can further complicate and slow a testing process. Possible concurrent combinations of test lines and test equipment available to a tester are generally limited by the number and location of test lines and test equipment. While use of a digital cross connect may somewhat increase the efficiency of a testing process, a testing process may still be limited by the availability of test equipment ports in a digital cross connect, and by the location and features of test lines connected to a digital cross connect. Therefore, configuration changes are generally time consuming because configuration changes require that a human tester determine what configurations presently exist and what configurations are possible. Then a human tester is required to manually rewire telephone circuits and/or manually reconfigure features of lines to be used in a test. Of course, the foregoing manual configuration changes may be performed only by a human tester with the appropriate level of knowledge and experience for all of the systems and/or equipment being tested. Many persons in a test laboratory generally lack this proper level of knowledge and experience for some, if not all, of these systems and/or equipment being tested.

Accordingly, it is presently cumbersome and inefficient to test an ITCMS. Because present testing overly relies on testers lacking the appropriate subject matter expertise, present testing is not only slow, but is not always accurate. Further, to assist and/or support such testers, present ITCMS testing requires expensive human resources with the appropriate level of knowledge and experience who may be available on a limited basis, if at all. Moreover, ITCMS testing cannot presently be performed when such human resources are not available, meaning that equipment in a test lab may sit unused for periods of time when it could be more efficiently used to conduct tests.

DETAILED DESCRIPTION OF THE PREFERRED EMBODIMENTS

A computer such as a personal computer may be used to host one or more various computer programs, sometimes including scripts, for automating tests of an Integrated Telephony Call Management Service (ITCMS). The ITCMS generally includes a client application that may be included on the computer with the scripts. Test results may be stored in a database attached to or included in the computer that hosts the afore-mentioned computer programs. Using modems attached to or included in the computer, the computer programs cause calls to be made to various telephone numbers, including numbers associated with the ITCMS client. By comparing activity in a graphical user interface provided in the ITCMS client with expected results, it is possible to test the functionality of the ITCMS. Calls from the computer modems to the ITCMS are generally made through a telephony network that includes Service Control Point (SCP), such as an advanced intelligent network (AIN), and connections may be established through a digital cross connect to numbers that receive calls through a network associated with the telephony network. The telephony network may be a circuit switched or a packet switched network, e.g., a network for transporting telephony communications.

Figure 1:
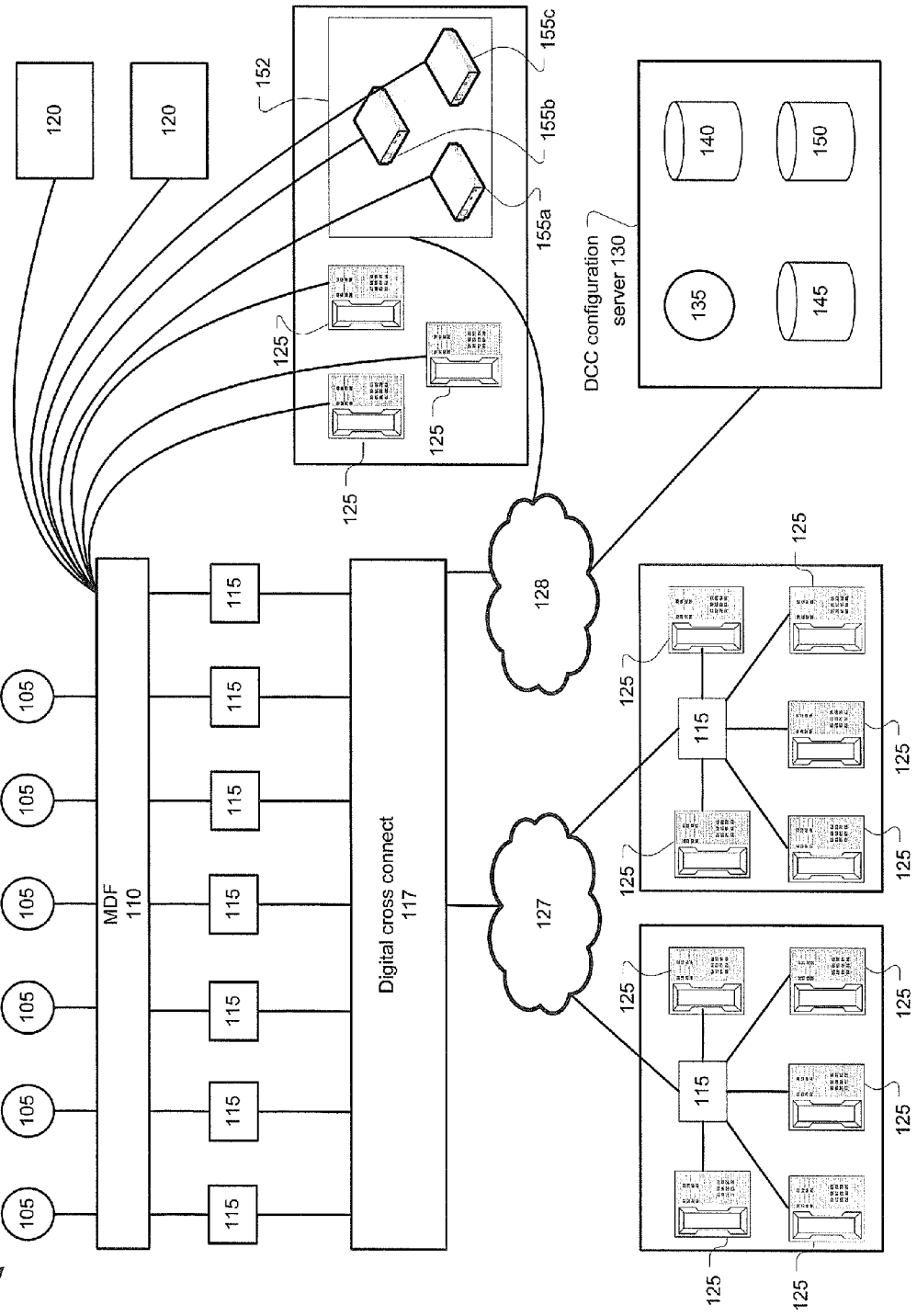
FIG. 1 illustrates a system for testing telephony equipment, according to an embodiment.

FIG. 1 illustrates a system 100 for testing telephony equipment, according to an embodiment.

Central office switches 105 may include any switches known for use in a telecommunications provider's network. Switches 105 are generally digital switches that include multiple channels for transporting voice and/or data communications. Various switches 105 provide the ability to switch various kinds of communications, e.g., central office switches 105 may include packet lines, integrated services digital network (ISDN) lines, etc. Lines from switches 105 are connected to a main distribution frame (MDF) 110, which is used to physically connect lines within a central office. Lines from MDF 110 are connected to D4 digroups 115 that provide an interface between Digital Signal 0 (DS0) lines and Trunk Level One (T-1) links. Of course, a D4 digroup is not required for central offices that provide a T1 interface.

MDF 110 is also connected to lines from test equipment 120 and/or telephones 125, modems 155, etc. Test equipment 120 may include load boxes, remote access devices (RADs), modems, etc. Telephones 125 may be any one of a variety of known telephones, analog or digital, including Integrated Services Digital Network (ISDN), P-set etc. For example, in general, a P-Set uses a proprietary message set from Nortel Networks, Inc. of Brampton, Ontario to manage a multi line business phone set. A P-set phone uses a single pair of wires to handle multiple lines, indicators and features. Further, telephones 125 may generally include any kind of terminating telephony equipment, i.e., equipment capable of receiving a telephone call. In any event, lines from test equipment 120 and/or telephones 125 are connected to a digroup 115 that provides T-1 transmissions, through a digital cross connect (DCC) 117, to a test network such as telephony network 127.

DCC 117 is well known for providing data multiplexing and switching to connect lines that carry voice and data signals. As is known, DCC 117 allows users to digitally, rather than manually, connect lines by providing commands indicating which ports in DCC 117 are to be connected to one another, lines being connected to ports in DCC 117. Ways of automatically mapping lines within DCC 117 are described in previously application Ser. No. 11/828,631, now U.S. Pat. No. 8,199,748, Issued Jun. 12, 2012, entitled "AUTOMATED CONFIGURATION OF A DIGITAL CROSS CONNECT," which co-pending application is fully incorporated herein by reference in its entirety.

Figure 2:
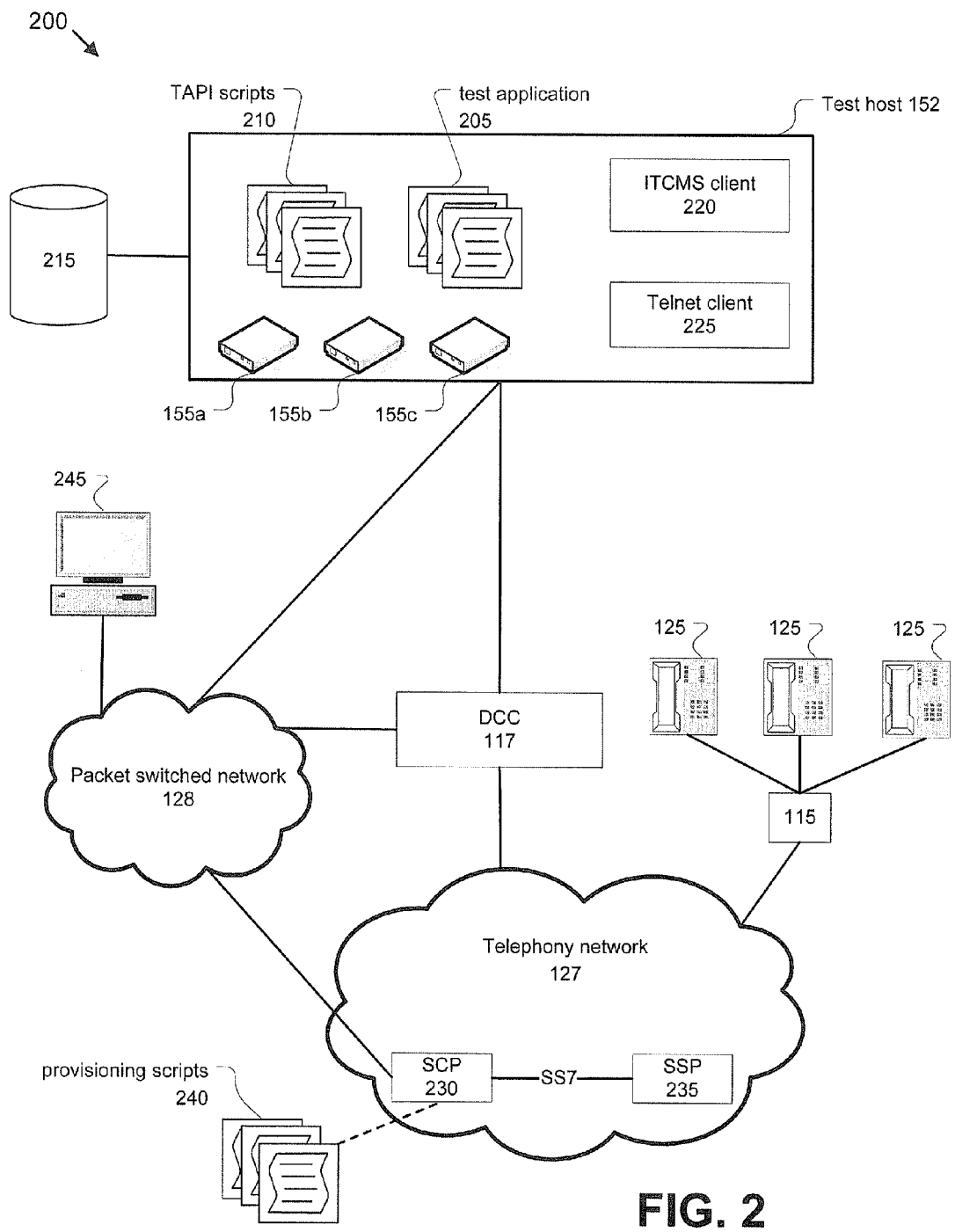
FIG. 2 illustrates a test host, according to an embodiment.

A DCC configuration server 130 is generally a computing device such as discussed below. Configuration server 130 generally includes a mapping application 135, a configuration queue 140, a configuration database 145, and an interface script database 150. Databases 145 and 150 may be included within server 130, or may be located within a separate computing device. Similarly, queue 140 is generally, but not necessarily, located within DCC configuration server 130. DCC configuration server 130 generally communicates with other elements of system 100 via packet switched network 128, and is used to automatically configure DCC 117 to cross-connect modems 155a, 155b, and 155c, which are included within or attached to a test host 152. Originating ports, i.e., ports in DCC 117 that are connected to lines that originate calls, and terminating ports, i.e., ports in DCC 117 that are connected to lines that receive calls, may thereby be efficiently connected. As illustrated in FIG. 2, discussed further below, a test host 152 includes a test application 205.

Test telephony network 127 is a telephony network and as such may include a circuit switched network such as a network that operates in a manner similar to the known public switched telephone network (PSTN), although a circuit switched network may be dedicated to test system 100. Network 127 may also include a private branch exchange (PBX), or other known network for switching and transporting telephony communications.

Packet switched network 128 is a packet switched network, and is preferably an Internet Protocol (IP) network. Further, packet-switched network 128 may include or may be a subset of the Internet. However, it is generally preferable that network 128 be a local area network (LAN) or the like that is separate from the Internet for increased security and control of bandwidth, among other reasons.

It is to be understood that network 127 need not but could include or could be a packet switched network, such as a local area network (LAN), wide area network (WAN), e.g., the Internet, etc. Further, all or part of telephony network 127 could be part of a packet switched network such as packet switched network 128, discussed in more detail below with regard to FIG. 2. However, it is generally preferable to keep networks 127 and 128 separate to ensure that bandwidth on a packet switched network is not consumed by server traffic and the like to the point where there is insufficient bandwidth for carrying out telephony communications.

Mapping application 135 may be written in one or more programming languages and compiled or interpreted to provide computer-executable instructions for automatically establishing connections in DCC 117. For example, in one embodiment, mapping application 135 includes multiple files written in a UNIX shell scripting language. Embodiments are possible in which mapping application is located within a computing device or devices other than DCC configuration server 130, e.g., test host 152 described further below with reference to FIG. 2. Furthermore, certain features and functions of mapping application 135 are described in more detail in the above-mentioned co-pending application "AUTOMATED CONFIGURATION OF A DIGITAL CROSS CONNECT."

Configuration queue 140 is a queue of instructions for mapping application 135 to map ports in DCC 117. Instructions may be stored in queue 140 after being retrieved from database 145 until mapping application 135 is free to send such instructions to DCC 117. For example, mapping application 135 may include programming to send a first command to DCC 117 to connect two ports in DCC 117, and may be further programmed to await a response from DCC 117 before sending a second command to connect two ports in DCC 117. In such case, instructions to map, i.e., connect, ports in DCC 117 may be stored in configuration queue 140 until such time as mapping application 135 is ready to retrieve such instructions from queue 140 and a command based on such instructions may be sent to DCC 117.

Configuration database 145 generally includes a list of all of the ports in DCC 117 that a user is allowed to view and/or configure. In some instances, this list further restricts certain users to viewing certain ports in DCC 117. Configuration database 145 may further include stored sets of mappings, i.e., instructions for connecting ports in DCC 117, as discussed further below.

Interface script database 150 may include interface scripts that are optionally used to provide a graphical user interface (GUI) to configuration queue 140, although it is possible that script database 150 may use text-based interfaces such as a UNIX shell command line interface. For example, interface scripts 150 may include known web scripting and/or programming technologies, including one or more of hypertext markup language (HTML), JavaScript, Perl, PHP, etc. Among other things, an interface to DCC configuration server 130 such as a GUI may be used to specify line mappings, i.e., commands to connect one port in DCC 117 to another port in DCC 117, to store mapping configurations in configuration database 145, to view stored configurations, to specify configurations to be executed, etc. Such mapping operations are discussed further in the above-mentioned co-pending application "AUTOMATED CONFIGURATION OF A DIGITAL CROSS CONNECT." Some or all of the functionality discussed with respect to DCC configuration server 130 may be implemented on test host 152 and/or database 215 as discussed further below with reference to FIG. 2. The location and precise configuration of DCC 117 and DCC configuration server 130 are not critical to providing automated mapping for DCC 117.

FIG. 2 illustrates a system 200 for automated testing of an integrated telephony call management service, according to an embodiment.

Test application 205 is stored on a computer-readable medium that is generally included in test host 152. In one embodiment, test application 205 includes one or more scripts that are written to be interpreted by the Mercury WinRunner® software sold by Mercury Interactive Corporation of Mountain View, Calif., which software may be installed in test host 152. However, test application 205 could include other programming technologies. For example, test application 205 could include scripts that are written to be interpreted by a product other than WinRunner, or could be written in a programming language that is compiled rather than interpreted, or could include some combination of compiled and interpreted programming. In some embodiments, test application 205 and mapping application 135 are combined into a single application.

One or more Telephony Application Program Interface (TAPI) scripts 210, also included on test host 152, access a TAPI programming interface through which a computer can be programmed to communicate via a telephone line. TAPI is well known and widely available, e.g., TAPI is included in many versions of the Windows® operating system provided by Microsoft Corporation of Redmond, Wash. For example, using TAPI, it is possible to create a computer program including a graphical user interface (GUI) that allows a user to place a telephone call by selecting an icon representing a person or telephone number to be called, the name of a person to be called from an address book etc. TAPI also makes possible computer programs that allow a user at a personal computer to receive a telephone call, to send and receive facsimile messages, etc.

Modems 155a, 155b, and 155c are included in or attached to test host 152 and are also connected to DCC 117, as illustrated in FIG. 1, and as is also reflected in the connection between test host 152 and DCC 117 illustrated in FIG. 2.

Integrated telephony call management service (ITCMS) client 220 is client software for an ITCMS such as the "iobi" service provided by Verizon Communications, Inc. of New York, N.Y. Accordingly, ITCMS client 220 allows users to manage ITCMS services such as call forwarding, caller identification, voice mail, real time call transfer, etc.

Telnet client 225, also included on test host 152, is well known for providing terminal emulation to allow computers such as test host 152 to communicate with other computers possibly having different operating systems via networks such as the Internet. For example, telnet client 225 may be used to access DCC configuration server 130 and a service control point (SCP) 230.

It should be understood that some or all of the components described as included within test host 152 could be included on separate computing devices. For example, application 205 and/or scripts 210 could be stored in a database 215 or some other computing device.

In some embodiments, test host 152 actually includes two or more computers, each of which provides one or more of the functions described herein as being provided by test host 152. For example in one embodiment test host 152 includes one or more computers that each include an instance of ITCMS client 220, and one computer that includes other components of test host 152 described herein. Test host 152, sometimes referred to as a test computer, communicates with test database 215, DCC 117 (discussed in more detail above), SCP 230, etc. via one or more networks such as telephony network 127, and/or packet switched network 128.

SCP 230 is well known for providing computer-controlled telephone services such as call forwarding, interacting with callers, and the like. For example, in an embodiment, SCP 230 is implemented as an advanced intelligent network (AIN) as specified by Telcordia Technologies, Inc. of Piscataway, N.J. SCP 230 generally communicates with service switching point (SSP) 235 according to the known signaling system 7 (SS7) protocol. Further, SCP 230 generally includes one or more provisioning scripts 240 to provision services such as AIN services for a device, e.g., modem 155, telephone 125, etc., to receive a call.

FIG. 2 further shows a test client 245. It is to be understood that system 200 may include multiple test clients 245, or that the use of test client 245 described herein may be made of test host 152. In any event, test client 245 may be any one of a number of different kinds of computing devices, and is generally connected to packet switched network 128. Test client 245 generally allows a user to interact with various elements of system 200, in particular, test application 205, ITCMS client 220, and telnet client 225 in test host 152.

Figure 3:
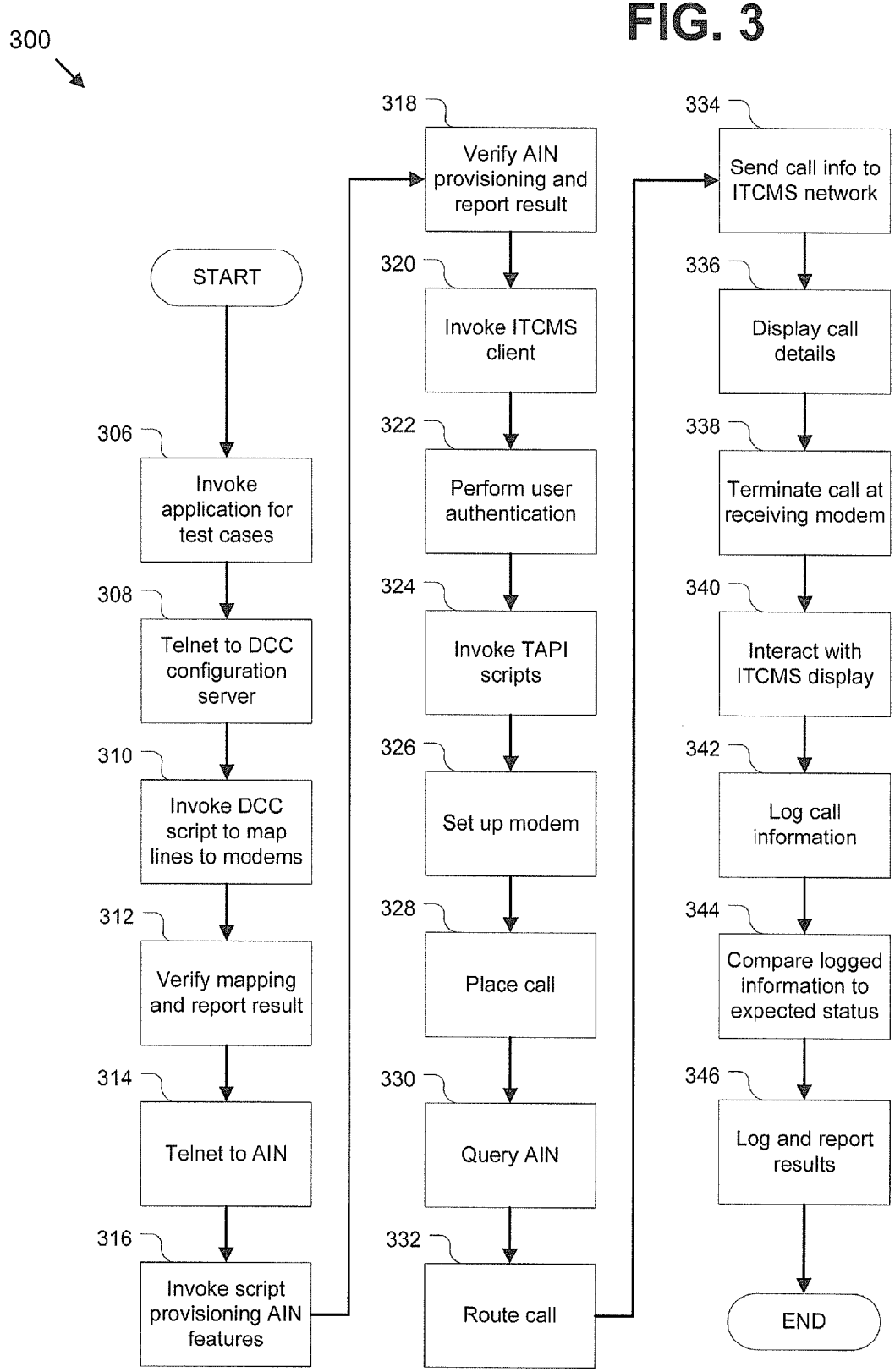
FIG. 3 illustrates a process for testing an integrated telephony call management system (ITCMS), according to an embodiment.

FIG. 3 illustrates a process 300 for testing an ITCMS, according to an embodiment.

In step 306, test host 152, generally upon receiving a user command submitted through an interface such as a graphical user interface (GUI), invokes test application 205 to execute test cases that a user desires to execute. In an embodiment, test scripts included in test application 205 may be stored on and retrieved from test host 152 or database 215. Test application 205 may be programmed to execute a wide variety of test cases. For example, test cases executed by test application 205 could include testing whether ITCMS client 220 can be successfully logged into, whether call management functionality in an ITCMS is turned on or off, whether ITCMS client 220 can place calls, whether ITCMS client 220 can receive calls, whether ITCMS client 220 can forward calls, whether ITCMS client 220 can block some or all incoming calls (e.g., calls from predetermined telephone numbers), etc.

Next, in step 308, application 205 causes telnet client 225 to establish a telnet session with DCC configuration server 130. For example, application 205 may include an instruction to instantiate telnet client 225 and an instruction to telnet client 225 to connect to an address, e.g., an IP address, associated with DCC configuration server 130, which in turn communicates with DCC 117.

Next, in step 310, through telnet client 225, test host 152 invokes mapping application 135, which in turn sends commands to DCC 117 to connect ports associated with lines to be used for a test of an ITCMS to modems 155a, 155b, and/or 155c, as appropriate for the test that is to be performed. For example, as is known, DCC 117 includes multiple ports that may be mapped to a specific channel in a switching device such as switch 105. Specific lines in switch 105 may be associated with a particular modem 155, test device 120, telephone 125, etc. For many tests of an ITCMS, only two modems 155a and 155b are needed and therefore must be mapped through DCC 117; however a third modem 155c is required for testing call forwarding functionality. It further is to be understood that a third modem 155c could be used for testing other telephony services. Mapping ports in DCC 117 is described in further detail in co-pending application "AUTOMATED CONFIGURATION OF A DIGITAL CROSS CONNECT," mentioned above.

Next, in step 312, mapping application 135, by sending messages to, and receiving messages from, DCC 117, verifies that the mapping performed was successful and reports the result of the mapping, e.g., by repeating a command that was successfully executed followed by an indicator such as "COMPL" to indicate that the command was successfully executed, to test host 152. Test host 152 may in turn cause this result to be displayed on test client 245, e.g., by displaying a message such as "mapping successful" and/or reporting the connection that was successfully established. Exemplary operations of mapping application 135 are discussed in more detail in co-pending application "AUTOMATED CONFIGURATION OF A DIGITAL CROSS CONNECT," mentioned above.

Next, in step 314, telnet client establishes a telnet session with SCP 230.

Next, in step 316, script or scripts 240 are invoked by test host 152 and run on SCP 230 to provision desired features for a test of an ITCMS, such as call forwarding, interacting with callers, and the like for a device, e.g., modem 155, telephone 125, etc, to receive a test call.

Next, in step 318, AIN SCP 230 verifies that the requested features have in fact been provisioned, and report the result to test host 152. The result of provisioning features may in turn be reported to test host 152 and displayed to a user.

Next, in step 320, application 205 causes ITCMS client 220 to be invoked.

Next, in step 322, application 205 authenticates a user for ITCMS client 220, e.g., by providing a user name, password, etc.

Next, in step 324, application 205 invokes TAPI script or scripts 210.

Next, in step 326, TAPI script 210 sets to listening mode a modem (or modems) 155 that was mapped to receive a call in step 310. In one embodiment, modem 155 is configured using well known "AT" commands for Hayes compatible modems.

Next, in step 328, script 210 causes modem 155a to dial a telephone number to be routed to a modem 155b designated to receive a test call according to the mapping performed in step 310.

Next, in step 330, the call placed in step 328 encounters a termination attempt trigger (TAT), whereupon a TAT query is sent to SCP 230, e.g., according to the SS7 protocol.

Next, in step 332, the call placed in step 328 is routed via network 127, which generally uses a known control system or network such as Signaling System 7 (SS7) signaling to establish and route calls.

Next, in step 334, SCP 230 sends information concerning the call placed in step 328 to ITCMS client 220 via network 127. However, such information may be sent using the well known transport control protocol/internet protocol (TCP/IP) via a packet network such as network 128.

Next, in step 336, ITCMS client 220 displays details to a user concerning the call placed in step 328. For example, information such as the number associated with modem 155a through which the call was placed, a name associated with that number, a date and time of the call, etc. could be displayed in step 336.

Next, in step 338, the call placed in step 328 terminates at the modem 155 configured in step 326. When a call is terminated, appropriate signaling occurs to tear down the call.

Next, in step 340, application 205 verifies that it can interact with ITCMS client 220, and may further verify the correctness of the information displayed in step 336 to ensure that the information received by ITCMS client 220 matches information concerning the call. Generally, this information is logged in database 215, on some other database, or in a file on test host 152, and application 205 reads this information. For example, in an embodiment, when a call is received by a modem 155, TAPI script 210 processes call information and populates database 215 with such information that is later used by application 205 to verify the correctness of the information concerning the call. In general, there are two sets of call-related data which are verified by application 205, the ITCMS display of call information verified by a user as described above with respect to step 336, and the information collected through TAPI from the modem or modems 155 which comes from the telephony network 127.

Next, in step 342, information concerning the call placed in step 328 and received in step 338 is logged in database 215. Logged information generally includes a call identifier, the number that was dialed, the number associated with ITCMS client 220 having received the call, etc. While in general steps of process 300 may be performed in an order other than described herein, in particular step 342 may be performed elsewhere, e.g., follow step 336 described above.

Next, in step 344, test host 152 compares information logged in step 342 with results expected from the call placed in step 328. For example, by retrieving information stored in database 215 as described with reference to step 340 above, the number dialed for the call placed in step 328 may be compared with the number of modem 155 receiving the call, the number of the modem 155 dialing the call in step 328 is compared to the call identifier received for the call, etc. Other examples could include almost any kind of intelligent routing, e.g., "time-of-day" routing, where a dialed number would not necessarily match a number assigned to a modem 155 receiving a call. Further, it is possible that none of the modems 155 receives the call placed in step 328, indicating a possible failure of process 300.

Next, in step 346, results of the comparison performed in step 344 are stored in database 215 by test application 205.

Following step 346, process 300 ends.

Conclusion

It is to be understood that computers used as discussed herein, e.g., DCC configuration server 130 and test host 152, may include any one of a number of well known computing devices, including, without limitation, a computer workstation, a desktop, notebook, laptop, or handheld computer, or some other known computing device, such as a Java-enabled cellular telephone or similar device. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Databases 145, 150, and 215 generally include database management software running on a computer such as is described above with reference to test host 152, such computer including an operating system such as described above. Database management software may store data on a computer-readable medium in a structured file (e.g., comma delimited, tab delimited, etc.), in a hierarchical format, a relational format, etc. Preferably database 215 includes a relational database management system (RDBMS) such as is well known, e.g., the Oracle database provided by Oracle Corporation of Redwood Shores, Calif. An RDBMS generally employs the well known Structured Query Language (SQL) in addition to a language for creating, storing, editing, and executing stored procedures, e.g. Oracle's PL/SQL. However, it is to be understood that database 215 may be some other kind of database such as a hierarchical database, a file, a set of files, an application database in a proprietary format, etc. In one embodiment, test database 215 uses the Microsoft Access database sold by Microsoft Corporation of Redmond, Wash.

Computer executable instructions such as stored and executed on configuration server 130 and test host 152 may be compiled or interpreted from computer programs created using a variety of known programming languages and/or technologies, without limitation, and either alone or in combination, Java™, C, C++, Visual Basic, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention. Accordingly, it is to be understood that the above description is intended to be illustrative and not restrictive. Many embodiments and applications other than the examples provided would be apparent to those of skill in the art upon reading the above description.

The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   a digital cross connect;
   a test computer that includes a test application, the test application including instructions for configuring the digital cross connect, the test computer being separate from the digital cross connect and connected to the digital cross connect via a first network;
   a first modem and a second modem, each modem being connected to the test computer; and
   a second network connected to the first and second modems and also connected to the digital cross connect,
   wherein the instructions for configuring the digital cross connect include instructions for mapping at least two ports of the digital cross connect, at least one port to each of the first and second modems, and
   wherein the test application is configured to use the first modem to send messages to and the second modem to receive messages from the digital cross connect and provide an indicator to verify that mapping was completed and the test application includes instructions for executing at least one test case for testing the ports according to the mapping.

2. The system of claim 1, further comprising an integrated telephony call management service (ITCMS) client, wherein the ITCMS client includes computer-executable instructions stored on a non-transitory computer-readable medium included in the test computer.

3. The system of claim 1, wherein the second network is a circuit switched telephone network; and further wherein the first network is a packet switched network.

4. The system of claim 1, wherein the instructions for configuring the digital cross connect include an instruction for connecting a first port in the digital cross connect to a second port in the digital cross connect.

5. The system of claim 4, wherein the instructions for configuring the digital cross connect include an instruction for determining whether the first port is connected to a type of line that may be connected to a line connected to the second port.

6. The system of claim 1, further comprising an intelligent network, wherein the test application includes instructions for provisioning features in the intelligent network.

7. The system of claim 1, further comprising a database, wherein the test application includes instructions for storing information concerning a test in the database.

8. The system of claim 1, wherein the at least one test case is a script that provisions calling between the first and second modem through the second network and digital cross connect.

9. The system of claim 1, further comprising a third modem connected to the test computer, wherein the third modem selectively receives calls forwarded by an integrated telephony call management service (ITCMS).

10. The system of claim 1, wherein the first and second modems are included in the test computer and are connected to the test computer via internal connections.

11. A test computer, comprising:
    a test application, the test application including instructions for configuring a digital cross connect, wherein the test computer including the test application is separate from the digital cross connect and connected to the digital cross connect via a first network;
    a first modem and a second modem, each modem being connected to a second network and a digital cross connect, the second network also connected to the digital cross connect;
    a configuration database configured to store ports accessible to a particular user; and
    an integrated telephony call management service (ITCMS) client, wherein the ITCMS client includes computer-executable instructions stored on a non-transitory computer-readable medium included in the test computer,
    wherein the instructions for configuring the digital cross connect include instructions for mapping ports of the digital cross connect according to the configuration database and
    wherein the test application sends messages to, and receives messages from, the digital cross connect to verify that mapping was completed and the test application includes instructions for executing at least one test case for testing the ports according to the mapping.

12. The test computer of claim 11, wherein the second network is a circuit switched telephone network; and further wherein the first network is a packet switched network.

13. The test computer of claim 11, wherein the instructions for configuring the digital cross connect include instructions for connecting a first port in the digital cross connect to a second port in the digital cross connect.

14. The test computer of claim 13, wherein the instructions for configuring the digital cross connect include instructions for determining whether the first port is connected to a type of line that may be connected to a line connected to the second port.

15. The test computer of claim 11, wherein the test application includes instructions for provisioning features in an intelligent network.

16. The test computer of claim 11, wherein the test application includes instructions for storing information concerning a test in a test database.

17. The test computer of claim 11, wherein the at least one test case is a script that provisions calling between the first and second modem through the second network and digital cross connect.

18. The test computer of claim 11, further comprising a third modem connected to the test computer, wherein the third modem selectively receives calls forwarded by the ITCMS.

19. A non-transitory computer-readable medium tangibly-embodying computer-executable instructions comprising instructions for:
- selecting a test case for an integrated telephony call management service (ITCMS);
- providing a first command from a configuration queue to a digital cross connect to configure the digital cross connect;
- providing a second command from the configuration queue, when the digital cross connect is ready to receive the second command, to the digital cross connect to connect with a first modem and a second modem;
- placing a call using the first modem associated with a test computer;
- receiving the call using the second modem associated with the test computer;
- providing call information to ITCMS client;

wherein the instructions comprise a test application for a test computer that is separate from the digital cross connect and that is connected to the digital cross connect via a first network, wherein providing the command to the digital cross connect to configure the digital cross connect includes providing instructions for mapping ports of the digital cross connect and verifying that the mapping was completely via sending messages to, and receiving messages from, the digital cross connect.

20. The medium of claim 17, further comprising instructions for verifying the call information provided to the ITCMS client.

21. The medium of claim 17, wherein the first network is connected to the first modem and the second modem; wherein the first network is a circuit switched telephone network; and a second network is a packet switched network and is connected to the first and second modems and the digital cross connect.

22. The medium of claim 19, further comprising instructions for connecting a first port in the digital cross connect to a second port in the digital cross connect.

23. The medium of claim 22, further comprising instructions for configuring the digital cross connect include an instruction for determining whether the first port is connected to a type of line that may be connected to a line connected to the second port.

24. The medium of claim 22, further comprising instructions for provisioning features in an intelligent network.

25. The medium of claim 22, further comprising instructions for storing information concerning a test in a database.

* * * * *